W. M. HUNTER.
PLOW.
APPLICATION FILED JUNE 17, 1908.

915,297.

Patented Mar. 16, 1909.

Witnesses

Inventor
W. M. Hunter.
By
Lacey, Attorneys

UNITED STATES PATENT OFFICE.

WILLIAM M. HUNTER, OF DECATUR, TENNESSEE.

PLOW.

No. 915,297.   Specification of Letters Patent.   Patented March 16, 1909.

Application filed June 17, 1908. Serial No. 439,007.

*To all whom it may concern:*

Be it known that I, WILLIAM M. HUNTER, a citizen of the United States, residing at Decatur, in the county of Meigs and State of Tennessee, have invented certain new and useful Improvements in Plows, of which the following is a specification.

The present invention relates to plows or cultivators, the purpose being to provide an implement of this character embodying a middle beam having a shovel blade, and side beams, also equipped with shovel blades, the several beams being of different relative lengths to throw the shovel blades in different positions, and the side beams being laterally adjustable to vary their position with reference to the middle beam.

For a full understanding of the invention and the merits thereof and also to acquire a knowledge of the details of construction and the means for effecting the result, reference is to be had to the following description and accompanying drawings.

Figure 1:
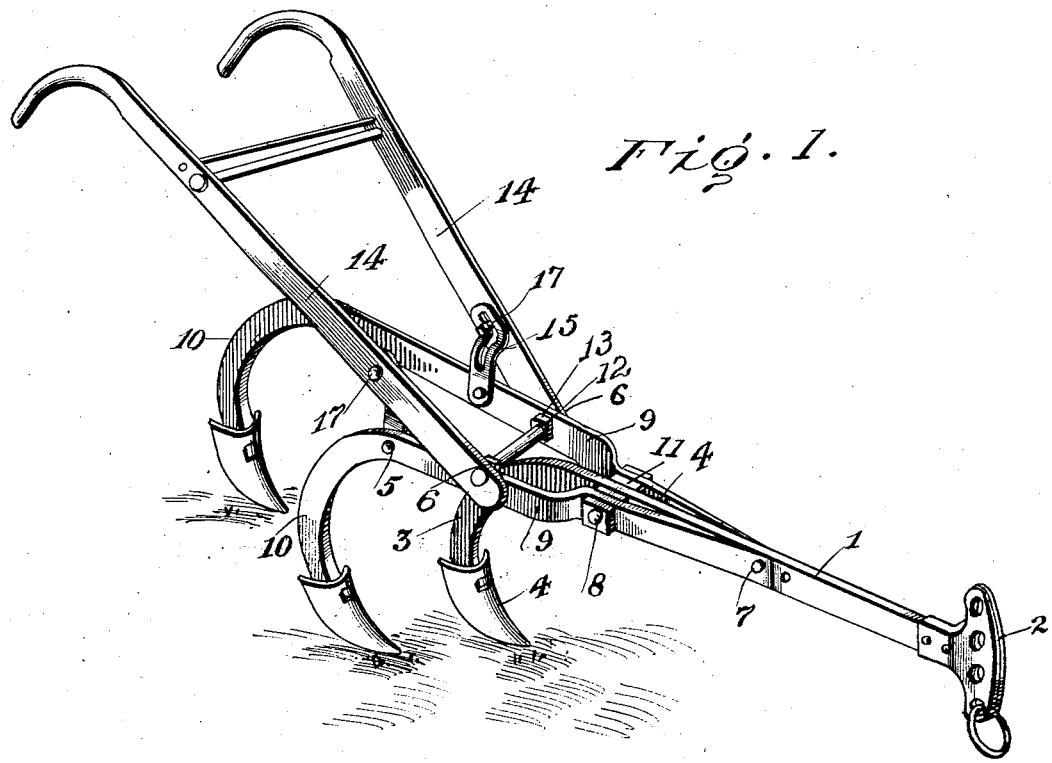
Figure 2:
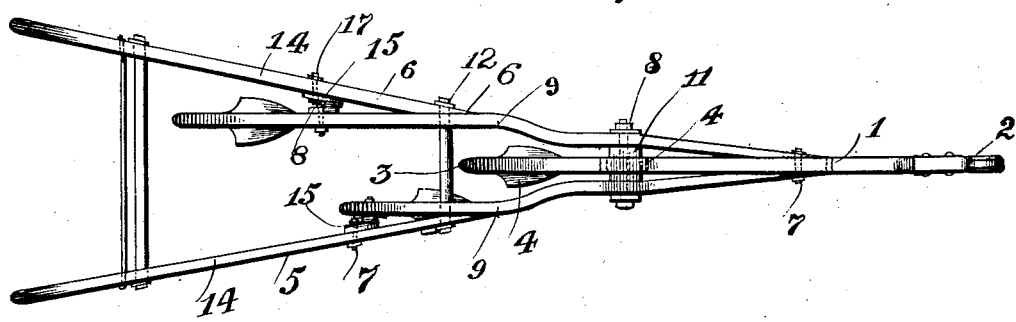

While the invention may be adapted to different forms and conditions by changes in the structure and minor details without departing from the spirit or essential features thereof, still the preferred embodiment is shown in the accompanying drawings, in which:

Figure 1 is a perspective view of an implement of the character aforesaid embodying the invention. Fig. 2 is a top plan view.

Corresponding and like parts are referred to in the following description and indicated in all the views of the drawings by the same reference characters.

The implement embodies a center beam 1 having at its front end a clevis 2 and provided at its rear end with a standard 3 to which a shovel blade 4 is attached, the same being of any style or make according to the particular work and nature of soil. Side beams 5 and 6 are located upon opposite sides of the beam 1 and are connected thereto by means of bolts 7 and 8, or like fastenings. Each beam 5 and 6 has an off-set 9 about midway of its ends, said beams being rearwardly diverged from their front ends to the off-set portions 9 and having the portions in the rear of the off-sets extending parallel and terminating in standards 10 to which are attached cultivator shovel blades 4 similar to that fitted to the standard 3, or of any design depending upon the special work.

The front ends of the beams 5 and 6 come close against opposite sides of the beam 1, whereas the rear portions are spread or spaced laterally, wedges 11 being interposed between the several beams and mounted upon a fastening 8 in the manner substantially as indicated in the drawings. By proper adjustment of the wedges 11 and the fastening 8, the rear ends of the beams 5 and 6 may be spaced apart to a greater or less extent. A bolt or tie rod 12 connects the rear portions of the beams 5 and 6 and its end portions are threaded and receive a pair of nuts 13 between which the respective beams are held. The handle bars 14 are mounted upon the bolt or tie rod 12 and are secured by the nuts 13. Braces 15 are interposed between the rear portions of the beams 5 and 6 and the respective handle bars to hold the latter in the required adjusted position. The upper ends of the braces 15 are formed with rear extensions and said extensions, as also the upper portions of the braces, are slotted, the slots being substantially of L-form. The bolts or fastenings 17 connecting the upper ends of the braces with the handle bars are adapted to operate in said slots. From the foregoing it will be understood that an implement is provided which may be used either as a cultivator or plow in which the side beams are laterally adjustable according to the distance between the rows to be cultivated or the extent of surface to be operated upon depending upon the draft and condition of soil. By having the middle shovel blade located in advance of the side shovel blades, the earth is loosened in a measure in advance of the operation of the side shovels, thereby facilitating the work and enabling the same to be performed with a minimum expenditure of power, and with less fatigue. The center beam is longitudinally adjustable between the side beams and is provided with a series of openings for reception of the fastening bolts 7 and 8.

Having thus described the invention, what is claimed as new is:

An implement of the character specified comprising a middle beam provided with a standard having a shovel, beams arranged upon opposite sides of the middle beam and rearwardly diverged and terminating at different distances from the rear of the middle beam and provided with standards bearing shovel blades, transverse fastenings connecting the middle and side beams, wedges mounted upon the rear fastening and arranged between the middle and side beams, a tie rod connecting the side beams with the rear of the middle beam, handle bars mounted upon said tie rod, and braces adjustably connecting the rear portions of the side beams with the handle bars, said braces having extensions at their outer ends, and said extensions and upper ends of the braces having slots to receive the fastening means.

In testimony whereof I affix my signature in presence of two witnesses.

WILLIAM M. HUNTER. [L. S.]

Witnesses:
M. H. STEWART,
STEWART LILLARD.